Jan. 9, 1951  S. E. HILL  2,537,187
ELEVATOR STRUCTURE FOR CROP HARVESTERS
Original Filed Nov. 20, 1944  2 Sheets-Sheet 1

INVENTOR
STANLEY E. HILL
ATTORNEYS

Jan. 9, 1951  S. E. HILL  2,537,187
ELEVATOR STRUCTURE FOR CROP HARVESTERS
Original Filed Nov. 20, 1944  2 Sheets-Sheet 2
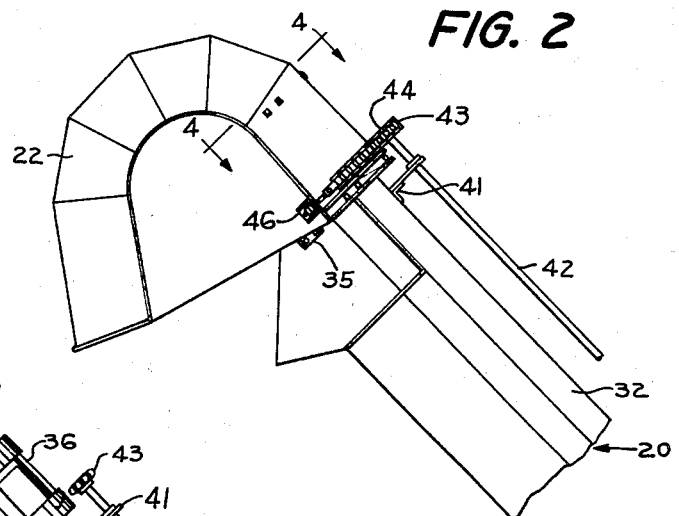
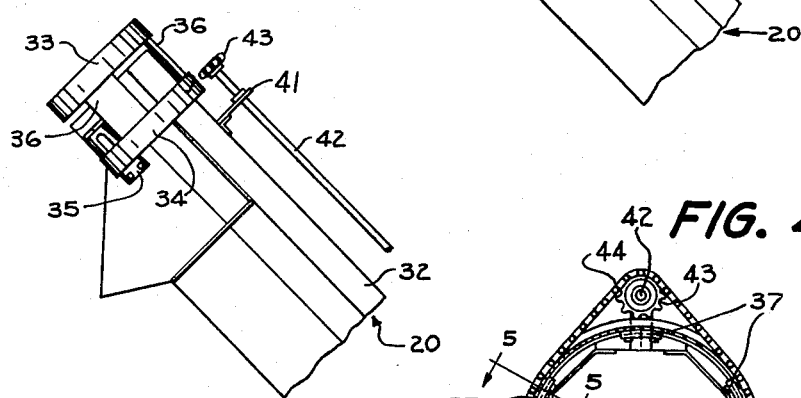
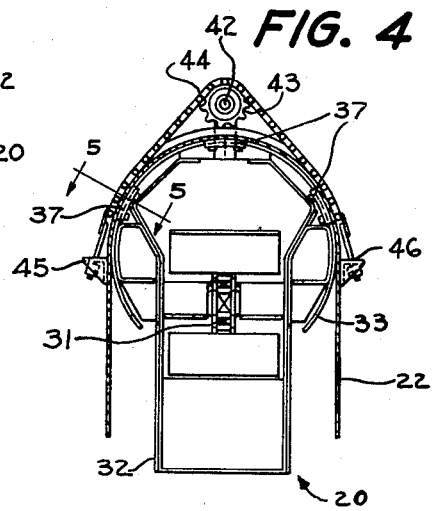
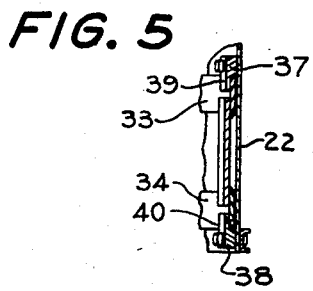
INVENTOR
STANLEY E. HILL
BY
ATTORNEYS

Patented Jan. 9, 1951

2,537,187

UNITED STATES PATENT OFFICE

2,537,187

ELEVATOR STRUCTURE FOR CROP HARVESTERS

Stanley E. Hill, Glen Ellyn, Ill., assignor to Deere & Company, Moline, Ill., a corporation of Illinois Original application November 20, 1944, Serial No. 564,292. Divided and this application February 6, 1948, Serial No. 6,675

3 Claims. (Cl. 198—72)

The application on which this application is based is divided out of co-pending application, Serial No. 564,292, filed November 20, 1944 and now Patent No. 2,494,080 granted January 10, 1950, in which application I am named as one of the joint inventors.

The invention pertains to an improved elevator or conveyor structure for delivering harvested crops from the harvesting mechanism of a harvester to a receptacle, such as a wagon or other vehicle towed alongside of or behind the harvester. It is desirable in a case of this kind to evenly distribute the corn or other harvested crop in the wagon or other receptacle so that the corn does not become heaped up in a localized spot in the wagon, it being noted in this respect that corn, for example, is not as "fluid" as is material of a finer nature.

It is the principal object of the present invention to provide an improved structure for adjusting or varying the discharge end of the elevator so that the corn or other harvested crop may be optionally or selectively delivered to various parts of the receptacle or wagon. Another object relates to improved mechanism for accomplishing the adjustment, a mechanism that is simple in construction, easy to operate and very unlikely to get out of order. In the usual harvester the harvesting mechanism is at the front of a supporting frame and the elevator is at the rear end and, whether the harvester is towed behind a tractor or mounted directly on a tractor, the elevator is at a point relatively remote from the operator's station. It is an object of the invention to provide means whereby the operator may control the discharge means on the elevator from his position on the operator's station.

Other objects inherent in and encompassed by the invention will become apparent to those skilled in the art from an examination of the following detailed description and accompanying sheets of drawings wherein there has been shown and described, by way of example, a preferred form of the invention.

In the drawings:

Figure 2 is a side elevational view of the upper or discharge portion of the elevator;

Figure 3 is a fragmentary view of the upper portion of the elevator with the discharge spout removed;

Figure 4 is an enlarged transverse sectional view taken substantially on the line 4—4 of Figure 2; and Figure 5 is a fragmentary sectional view taken substantially on the line 5—5 of Figure 4.

Figure 1:
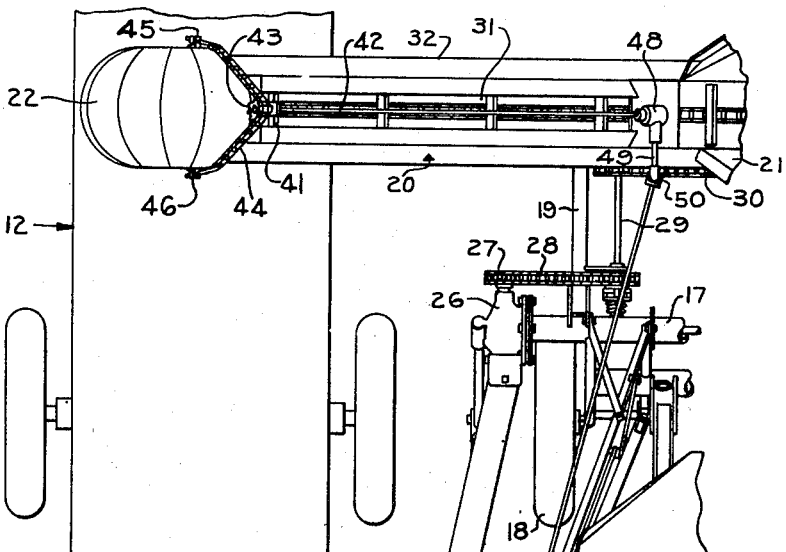
Figure 1 is a general plan view of a harvesting unit, showing the relative positions of a towing vehicle, a harvester, and a wagon associated therewith, each of the vehicles being illustrated in a fragmentary fashion for the purpose of permitting a larger illustration of the important details of the invention.
Figure 1:
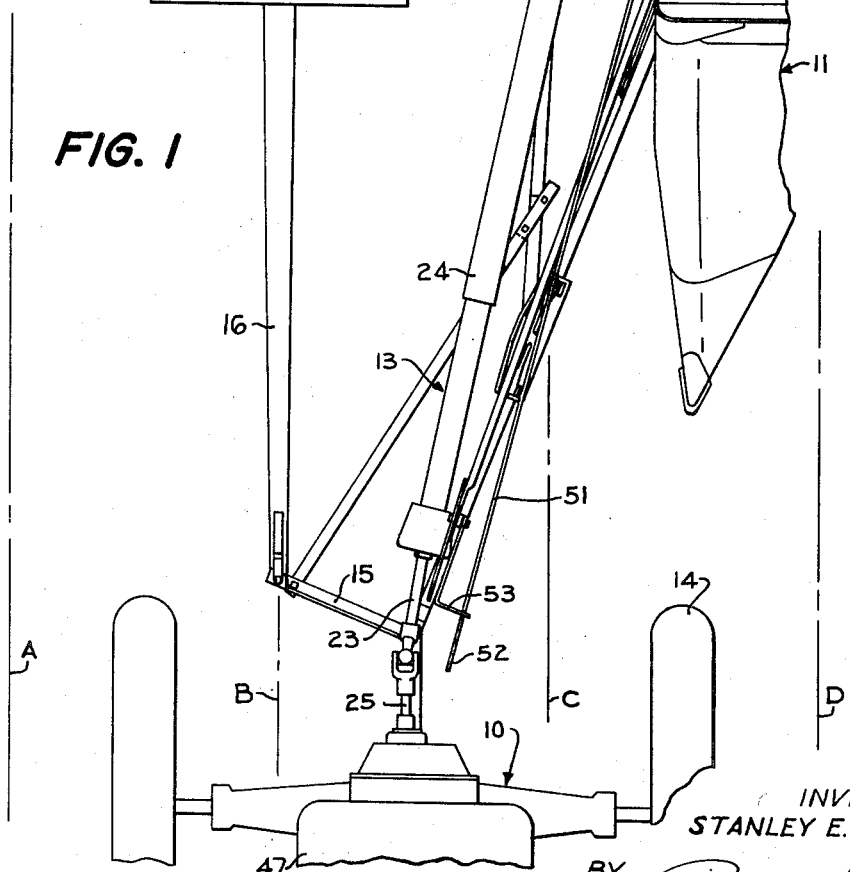

The preferred embodiment of the invention disclosed herein is illustrated and will be described in connection with a harvester of the corn picker type. It will be appreciated, however, that the fundamental principles of the invention are applicable to the handling of other materials and may readily be adapted to harvesters of other types. Accordingly, the disclosure should be taken as illustrative and not limiting.

The harvester unit chosen for the purposes of illustration and description is representative of one of several well known types and includes a tractor 10, only the rear portion of which appears in the drawings; a harvester of the corn picker type 11, only the right hand side of which appears in the drawings; and a crop-receiving receptacle or vehicle in the form of a wagon 12, only the forward portion of which appears in the drawings. The tractor 10 and corn picker 11 are connected by hitch means 13 in such a manner that the picker is towed behind and laterally to one side of the center line of the tractor, the tractor wheels, indicated at 14, traveling between adjacent corn rows, identified by the letters A, B, C and D, and the picker operating on the row D. The hitch 13 includes auxiliary or secondary hitch structure 15 to which a forwardly extending tongue 16 of the wagon 12 is connected, the connection being such that the wheels of the wagon straddle the row B and the body of the wagon is disposed alongside the rear portion of the picker 11. The picker includes suitable frame structure 17 carried on wheels 18 (only one of which is shown). The frame further includes a rearward extension 19 which provides supporting structure for a wagon elevator or conveyor 20 which inclines upwardly and outwardly away from the picker frame 17 and toward the wagon body 12. The lower or frame end of the conveyor 20 may be associated in the usual manner with a hopper 21 by means of which harvested corn is transferred from the picking mechanism of the picker to the conveyor 20 and thence to the wagon 12. The upper or discharge end of the conveyor or elevator 20 is provided with an adjustable spout 22, by means of which the corn is delivered to the wagon 12.

The hitch structure 13 is here shown as being of the type in which a power shaft 23 is enclosed within a tubular member 24 of the hitch. The forward end of the shaft 23 is drivingly connected to the power take-off shaft of the tractor 10, the latter part being indicated at 25. The rear end of the power shaft 23 may be associated in any suitable manner (not shown) with driving mechanism in a gear case 26 from which projects a driving shaft having keyed thereto a sprocket 27. A driving chain 28 is trained about the sprocket 27 and about a sprocket keyed to a longitudinally, rearwardly extending shaft 29. The shaft 29 serves, by means of a driving chain 30 and suitable other mechanism (not shown), to drive an endless conveyor 31 associated with the elevator 20. The conveyor 31, as is customary, operates to deliver material upwardly from the hopper 21 to the discharge spout 22.

The foregoing structure, apart from the improved elevator about to be described, is illustrated and described here only for the purposes of presenting a background for the invention. Novel elements and combinations of the structure just described are disclosed in detail and claimed in the copending application referred to above and in other copending applications, Serial No. 794,375, filed December 29, 1947, and Serial No. 794,309, filed December 29, 1947 and now abandoned.

The main component of the elevator 20 is an elongated casing 32 which may be described as having a generally tubular cross section (Figure 4). The upper or discharge end of the casing 32 includes, preferably as an extension thereof, swivel means for mounting the discharge spout 22 for angular or swinging movement optionally in either direction about an axis coincident with the principal axis of the casing. This means preferably takes the form of an upper track or swivel member 33 and a lower track or swivel member 34 (Figure 3). Each of these tracks is substantially circular in cross section, being interrupted in its circular extent at its bottom (Figure 4), and the periphery of each is such as to surround the upper end of the casing 32. The lower track 34 is rigidly, although adjustably, secured to the upper end of the casing 32 as by means of brackets 35, only one of which appears in the drawings. The adjustability provided by the mounting brackets 35 is such that the tracks 33 and 34 may be adjusted axially with respect to the casing 32. The track 33 is rigidly carried by the track 34 by a plurality of circumferentially spaced tie members 36 that extend in the direction of the principal axis of the casing. The two tracks 33 and 34, tied together by the members 36, may be considered as a unitary swivel structure for the purpose of mounting the spout 22.

The discharge spout may be of any conventional construction and is here shown as made up of a plurality of sections giving the spout a U-shaped configuration, one leg of the U being associated with the casing 32 in crop-handling communication therewith and the other leg serving as a downwardly directed spout for delivering corn to the wagon 12. The leg of the spout 22 that is associated with the casing 32 is carried on the tracks 33 and 34 by means of a plurality of mounting means in the form of shoes 37 and 38, one series of which engages the upper or outer track 33 and another series of which engages the lower or inner track 34, the outer shoes being designated at 37 and the inner shoes at 38. Each of the shoes 37 (Figure 5) is provided with a portion secured directly to the interior wall of the associated part of the discharge spout 22 and further includes a lug portion 39 which engages the inner periphery of the outer track 33. Each of the shoes 38 is similarly constructed and includes a lug portion 40 which engages the inner periphery of the lower track 34. The interior periphery of the wall of the discharge spout 22 rides on the outer peripheries of the tracks 33 and 34 and the lug portions 39 and 40 ride on the inner peripheries of the tracks, thereby mounting the discharge spout for angular swinging movement generally about the principal axis of the casing 32. It will be seen from Figure 1 that swinging of the discharge end of the spout 22 is fore and aft with respect to the body of the wagon 12; in other words, the spout may swing laterally from one side of the casing 32 to another side.

A further feature of the invention is the means by which the spout may be moved as aforesaid. For this purpose the upper or discharge end portion of the elevator casing 32 carries a support or bearing 41 providing a journal on an axis parallel to the principal axis of the casing. This bearing or journal carries for rotation therein a shaft 42 which parallels the general extent of the casing 32 and is positioned above the casing. The upper or outer end of the shaft 42 that extends through the bearing or support 41 projects to a point within the vicinity of the swivel means including the tracks 33 and 34 and is preferably provided with a rotatable operating member in the form of a sprocket 43 keyed or otherwise fixed to the shaft for rotation therewith. The general plane of the sprocket 43 lies in a plane that passes generally through the lower track 34, this plane being normal to the axis of the tracks 33 and 34 and therefore normal to the axis of rotation of the shaft 42. The sprocket 43 is connected to the discharge spout by flexible operating means including preferably a roller chain 44 connected at one end, as at 45, to one side of the discharge spout and at its other end, at 46, to the other side of the discharge spout. The intermediate portion of the chain 44 is trained about the sprocket 43 and in mesh with the teeth thereof. The connecting portions 45 and 46 are at substantially diametrically opposed portions of the part of the discharge spout that is coaxial with the tracks 33 and 34, so that rotation of the shaft 42 will effect rotation of the sprocket 43 and consequently effect rocking or swinging of the spout 22 about the axis of the tracks or swivel means 33—34. The location of the sprocket 43 generally in the plane of the inner track 34, as aforesaid, provides that forces transmitted by the chain 44 to the discharge spout 22 will be taken substantially directly by the track 34 and will preclude tilting or cocking of the spout 22 in such manner as to bind the swivel means.

A still further feature of the invention is the means by which the adjustment of the spout 22 is controlled from a point remote from the spout; in this case, from a point at the operator's station on the tractor 10. The operator's station is here designated by the numeral 47 and represents the seat on the tractor. In so far as the present invention is concerned, the operator's station may be mounted either on the tractor or on the harvester.

The shaft 42 extends longitudinally of the casing 32 from the upper end thereof to the lower or frame end and at the latter end is connected to gearing (not shown, but preferably a worm gear device) contained in a gear casing 48 from which extends a forwardly extending shaft 49. This shaft has at the forward end thereof a universal joint connection 50 with a relatively long forwardly extending control means or shaft 51, the forward end of which is cranked at 52 and in proximity to the operator's station 47, whereby the crank end is within easy reach of an operator on the tractor seat. A support 53 is carried by the hitch structure 13 and provides means for carrying the forward portion of the control shaft 51.

In the operation of the structure just described, it is merely necessary for the operator to reach behind him and turn the crank 52 to rotate the control shaft 51, rotation of which is transmitted to the universal joint 50 and shaft 49 to the operating shaft 42, and thence through the chain 44 to the discharge spout 22. The operator may optionally rotate the shaft 51 in either direction, thereby obtaining swinging of the spout 22 in either direction to thereby distribute the delivery of corn to the wagon 12 at longitudinally spaced points in the wagon. The connection of the lower end of the shaft 42 to the control shaft 51 at the lower portion of the elevator 20 eliminates undesirable changes in the positions of the parts that might occur were the control shaft 51 connected directly to the upper end portion of the elevator 20.

Other objects and desirable features of the invention will undoubtedly occur to those skilled in the art, the most important of these objects and features having been set forth above. Likewise, certain modifications and alterations in the preferred form of the invention illustrated will suggest themselves to those skilled in the art. It is, therefore, not desired to limit the invention by the precise details of construction illustrated and described.

What is claimed is:

1. A crop-handling elevator for a harvester or the like having a supporting frame, comprising an elongated elevator casing inclining upwardly away from the frame and having its upper end provided as a discharge portion; swivel means carried by the casing at its discharge portion and including a pair of coaxially spaced apart, generally circular members positioned at the discharge portion of the casing substantially as a continuation of said discharge portion and generally coaxial with the discharge portion as respects the principal axis of the casing; means securing one of the swivel members to the discharge portion, and means securing the other of the swivel members to said one swivel member; a discharge spout positioned generally as a continuation of the casing in crop-handling communication therewith, and means cooperating with the swivel members to mount the spout on the casing for swinging of said spout optionally in either direction with respect to the casing about the axis of the swivel means; a support carried by the casing at its discharge portion and providing a bearing the axis of which generally parallels the swivel axis; an operating member journaled in the bearing for angular movement optionally in either direction; means for moving the member angularly; said member including a portion in the vicinity of the discharge spout; and a flexible element engaged at one portion thereof with one side of the discharge spout, trained about the aforesaid member portion, and engaged at another portion thereof with the opposite side of the discharge spout.

2. The invention defined in claim 1, further characterized in that: the means mounting the discharge spout on the swivel means includes a plurality of shoes carried by an interior portion of the discharge spout and slidably engaging one of the circular members so that the spout may ride angularly in either direction on said member as aforesaid.

3. The invention defined in claim 2, further characterized in that: the portion of the operating member in the vicinity of the discharge spout is substantially in a plane normal to the axis of the swivel means and through the circular member on which said shoes ride so that force transmitted by said flexible element is taken substantially by said circular member and the shoes.

STANLEY E. HILL.

REFERENCES CITED

The following references are of record in the file of this patent:

UNITED STATES PATENTS

| Number | Name | Date |
|---|---|---|
| 597,275 | Erickson | Jan. 11, 1898 |
| 648,741 | Hartley | May 1, 1900 |
| 894,419 | Bennett | July 28, 1908 |
| 1,031,777 | Emtman | July 9, 1912 |
| 1,459,463 | Bobeldyk | June 19, 1923 |
| 1,798,231 | Thiemann | Mar. 31, 1931 |
| 1,800,920 | Wilson | Apr. 14, 1931 |
| 2,111,400 | Ledig | Mar. 15, 1938 |